(12) United States Patent
Horikawa

(10) Patent No.: US 7,376,549 B2
(45) Date of Patent: May 20, 2008

(54) SYSTEM PERFORMANCE PREDICTION MECHANISM AND METHOD BASED ON SOFTWARE COMPONENT PERFORMANCE MEASUREMENTS

(75) Inventor: Takashi Horikawa, Tokyo (JP)

(73) Assignee: Nec Corporation, Tokyo (JP)

( * ) Notice: Subject to any disclaimer, the term of this patent is extended or adjusted under 35 U.S.C. 154(b) by 496 days.

(21) Appl. No.: 10/757,426

(22) Filed: Jan. 15, 2004

(65) Prior Publication Data

US 2004/0148152 A1  Jul. 29, 2004

(30) Foreign Application Priority Data

Jan. 17, 2003  (JP)  ............... 2003-008936

(51) Int. Cl.
| G06F 9/45 | (2006.01) |
| G06F 9/44 | (2006.01) |
| G06F 11/30 | (2006.01) |
| G06F 15/00 | (2006.01) |

(52) U.S. Cl. .................. 703/22; 717/124; 717/134; 717/135; 702/182

(58) Field of Classification Search .............. 703/22; 717/124, 134, 135; 702/182
See application file for complete search history.

(56) References Cited

U.S. PATENT DOCUMENTS 5,450,586 A * 9/1995 Kuzara et al. .............. 717/124
5,881,268 A * 3/1999 McDonald et al. ........... 703/21
6,145,121 A * 11/2000 Levy et al. ................. 717/135
6,542,854 B2 * 4/2003 Yang et al. ................. 702/186

FOREIGN PATENT DOCUMENTS

| JP | 2002-108656 | 4/2002 |
| JP | 2002-215703 | 8/2002 |

OTHER PUBLICATIONS

Sameer Shende, Allen D. Malony, Craig Rasmussen, Mathew Sottile "A Performance Interface for Componenet-Based Applications" 0-7695-1926-1/03/$17.00, IEEE 2003, 8 pages.*

* cited by examiner

*Primary Examiner*—Paul Rodriguez
*Assistant Examiner*—Dwin McTaggart Craig
(74) *Attorney, Agent, or Firm*—Young & Thompson

(57) ABSTRACT

A system performance prediction mechanism based on software component performance measurements. The system performance prediction of the present invention is performed in the following procedure: (1) determine operating conditions, under which individual software components operate, from the software components and requests constituting a processing content of the transaction to be processed by the system; (2) determine system resource utilizations by searching a performance database 10 using each software component and operating conditions as keys; (3) combine results of searching for the system resource utilizations of all software components involved in processing of a transaction important in the system performance and predict the system resource utilization of the transaction; and (4) predict a system resource utilization of the entire system by combining the results obtained in the above (3) and inputting them into a system performance prediction model.

18 Claims, 14 Drawing Sheets

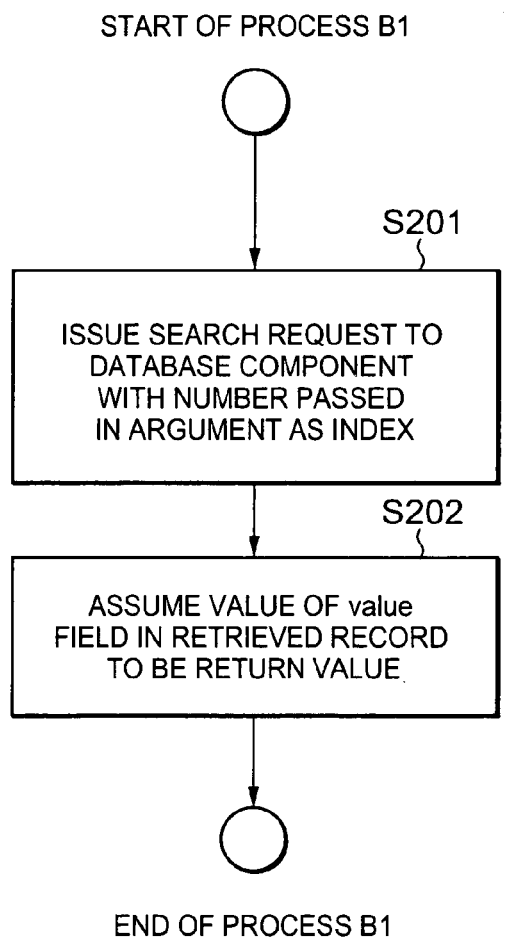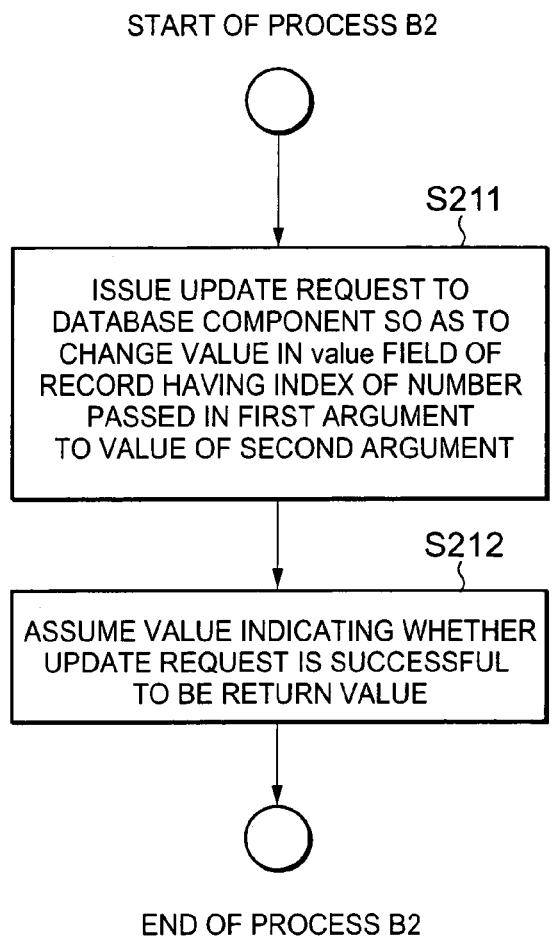

FIG. 8

| TIME | EVENT |
|---|---|
| 50 | PROGRAM STARTS CPU OPERATION |
| 100 | EVENT ①DETECTED |
| 150 | PROGRAM STOPS CPU OPERATION |
| 160 | PROGRAM RESTARTS CPU OPERATION |
| 200 | EVENT ②DETECTED |
| 250 | PROGRAM STOPS CPU OPERATION |
| 260 | PROGRAM RESTARTS CPU OPERATION |
| 300 | EVENT ③DETECTED |
| 400 | PROGRAM STOPS CPU OPERATION |
| 410 | PROGRAM RESTARTS CPU OPERATION |
| 500 | EVENT ④DETECTED |
| 550 | PROGRAM ENDS CPU OPERATION |

PERIOD OF TIME DURING WHICH MEASURED COMPONENT IS OPERATING

FIG. 9

| COMMUNICATION COMPONENT A | | APPLICATION COMPONENT B | | DATABASE COMPONENT C | |
|---|---|---|---|---|---|
| OPERATING CONDITION | CPU TIME | OPERATING CONDITION | CPU TIME | OPERATING CONDITION | CPU TIME |
| ONE ARGUMENT | 10 | PROCESS B1 | 5 | SEARCH | 50 |
| TWO ARGUMENTS | 15 | PROCESS B2 | 10 | UPDATE | 70 |

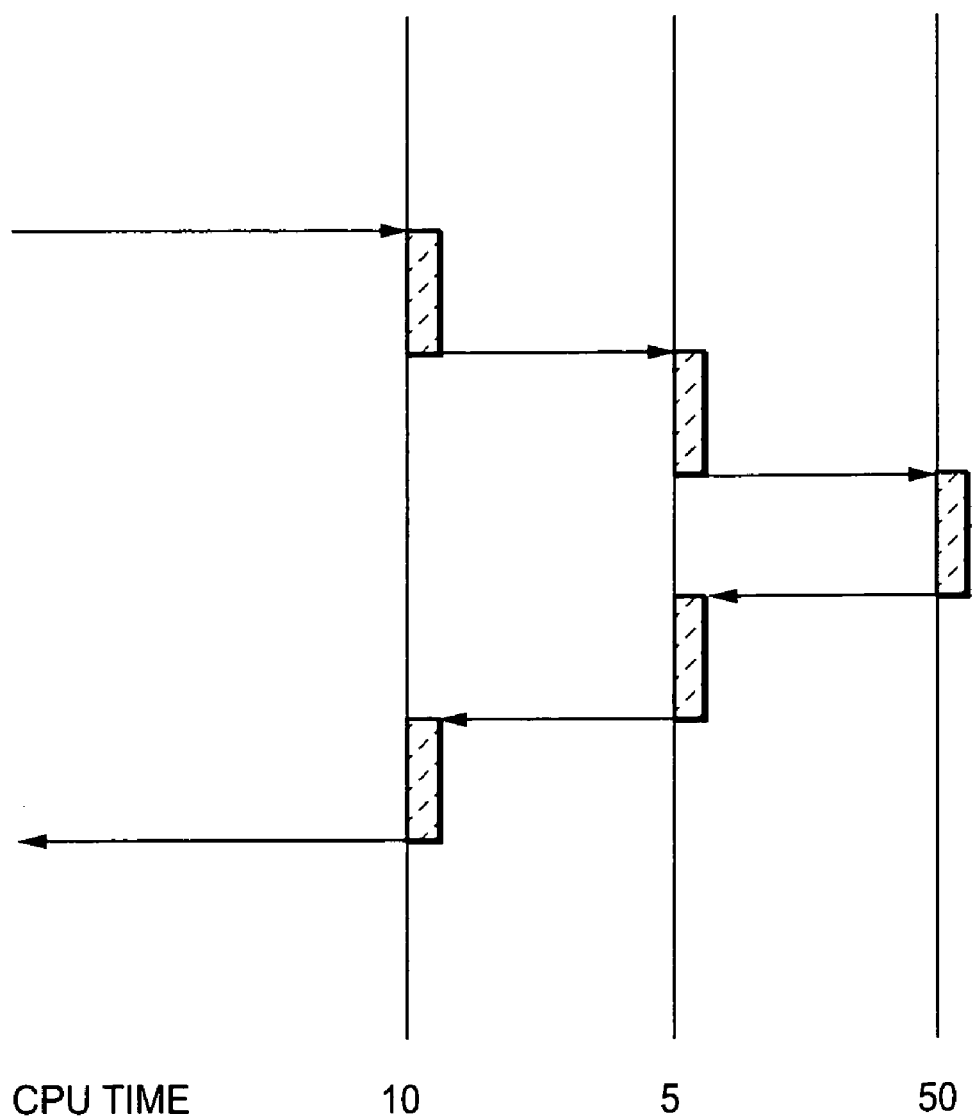

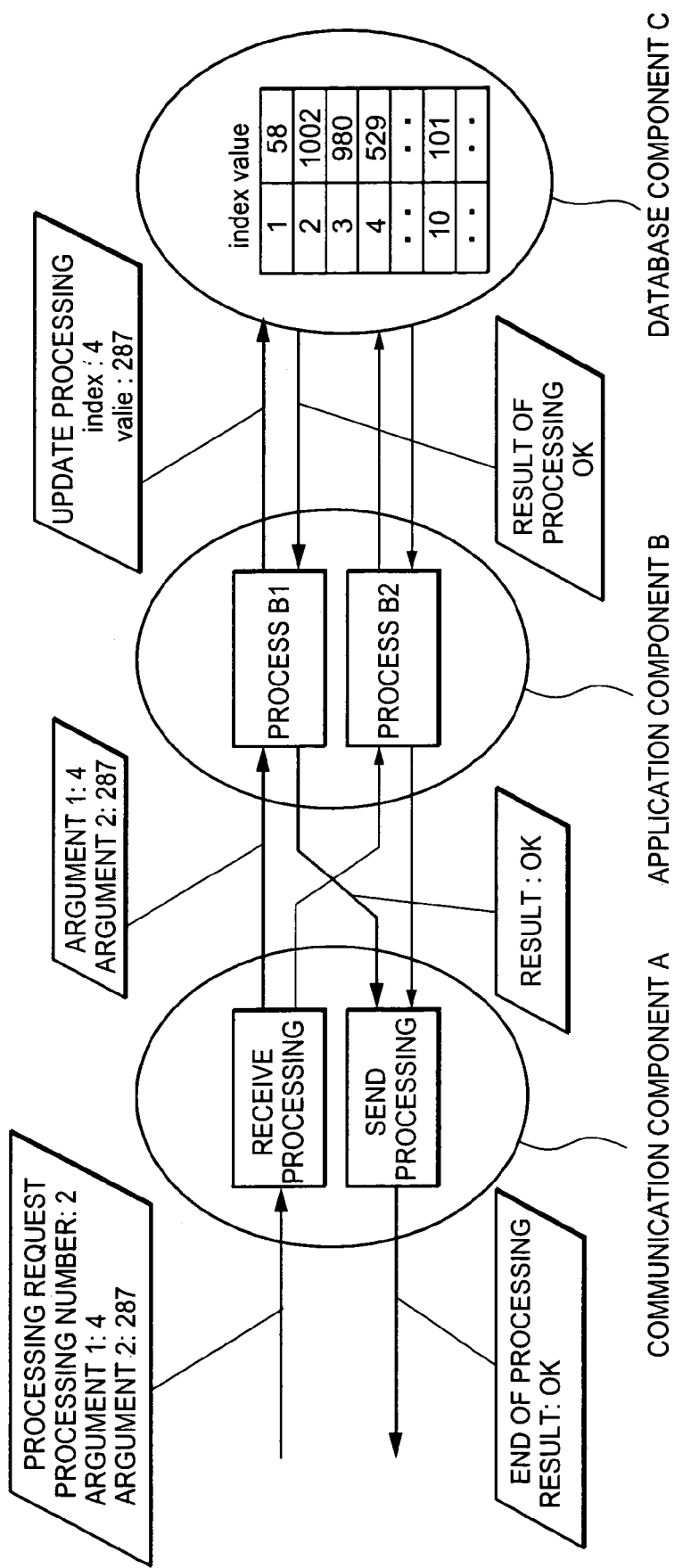

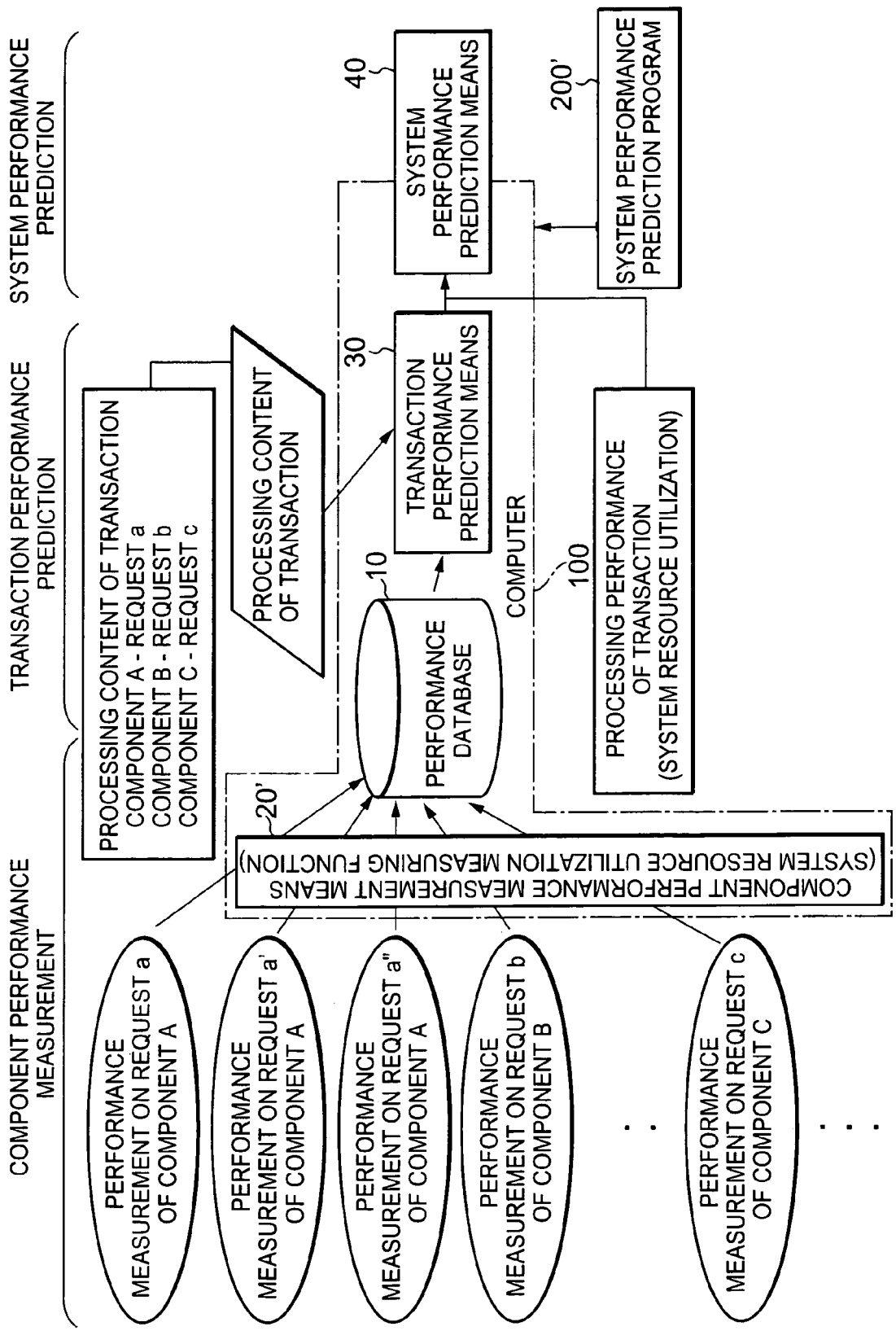

SYSTEM PERFORMANCE PREDICTION MECHANISM AND METHOD BASED ON SOFTWARE COMPONENT PERFORMANCE MEASUREMENTS

BACKGROUND OF THE INVENTION

1. Field of the Invention

The present invention relates to a system performance prediction mechanism based on performance measurements of software components, and more particularly to a system performance prediction mechanism based on performance measurements of software components in a system that combines a plurality of software components.

2. Related Background Art

In a first conventional system construction, a desk study of performance is conducted in the early stage of designing or performance measurement of a prototype system is conducted in some cases, whereas performance is rarely evaluated by measuring a system under development. In most cases, a performance evaluation of a development system is performed for the first time in a joint test phase when the entire system starts to operate (for example, Japanese Unexamined Patent Publication (Kokai) No. 2002-108656 (pp. 8 to 10, See FIG. 1)).

In a second conventional performance evaluation (prediction) methodology in a system construction, there has been disclosed a method of dividing software execution to be able to estimate a system resource utilization necessary for executing a program before predicting a system performance based on system resource utilization estimated for individual processing steps (for example, refer to the technical literature, "Connie U. Smith, Software Performance Engineering, pp. 157-224, Addison-Wesley, Reading, Mass.").

In the first conventional technology, the performance of the development system is evaluated for the first time in the joint test phase when the entire system starts to operate. Therefore, if a performance problem is found at that time, it is impossible to take large-scale countermeasures such as a change of a basic architecture of a system since the time for countermeasures is limited, thereby causing a problem that the countermeasures are limited to superficial ones having only poor effects. Therefore, in some cases, the performance cannot be improved enough, by which it causes such a situation as missing the time of delivery or a situation that a system integration vender copes with the problem by enhancing the hardware without compensation.

Furthermore, in the second conventional technology above, a software developer estimates a system performance for each processing step, thereby causing a problem that the performance cannot be measured systematically.

SUMMARY OF THE INVENTION

In view of these problems of the conventional technologies, the present invention has been provided. Therefore, it is an object of the present invention to provide a system and method for evaluating performance of a system that combines a plurality of software components (component base). The system performance prediction mechanism and method are based on software component performance measurements that enable prediction of system resource utilization for the entire system by previously measuring system resource utilization of the individual software components and combining the measured system resource utilizations of the software components, instead of measuring the system resource utilization under conditions of all the software components combined.

To achieve the above object, the system includes: component performance measurement means for previously measuring system resource utilization of individual software components constituting the system and storing them in a performance database; transaction performance prediction means for predicting a system resource utilization of a transaction to be processed by the system from a result of searching a performance database in consideration of the software components and requests constituting a processing content of the transaction; and system performance prediction means for predicting a system resource utilization of the entire system by inputting the system resource utilization of the transaction predicted by the transaction performance prediction means into a system performance prediction model.

The system performance prediction method of the present invention is performed in the following procedure:

1) Determine operating conditions under which individual software components operate from the requests constituting the processing content of the transaction to be processed by the system, 2) Determine system resource utilization by searching the performance database using each software component and operating conditions as keys, 3) Combine results of searching for the system resource utilization of all software components involved in processing of a transaction important in the system performance and predict the system resource utilization of the transaction, and 4) Predict the system resource utilization of the entire system by combining the results obtained in step 3) and inputting them into the system performance prediction model.

Thus, it becomes possible to predict the system performance based on the performance measurements of the software components.

As apparent from the aforementioned aspects, the present invention has a first effect of enabling a prediction of a performance of the entire system constructed by combining a plurality of software components, without constructing a real system. The overall system performance is predicted by combining results of measuring performances of the individual software components separately.

A second effect of the present invention is that the overall performance can be predicted with respect to a system composed of various software components or a system for processing various transactions by previously constructing a performance database. The performance database stores as measurement results performances of basic operations of the software components processing various transactions, and therefore it is possible to predict the processing performances of different transactions.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 2 is a diagram explaining an example of transaction processing that a communication component, an application component, and a database component are involved in;

FIGS. 4A and 4B are flowcharts showing operations of the application component in FIG. 2, respectively;

FIG. 8 is a diagram showing an example of a content of an event trace in FIG. 6;

FIG. 9 is a diagram showing an example of contents of a performance database created with respect to the three types of software components shown in FIG. 2;

FIG. 10 is a sequence diagram showing that the CPU time for the entire transaction shown in FIG. 2 equals a sum of CPU time of the software components;

FIG. 11 is a diagram explaining another example of transaction processing that the communication component, the application component, and the database component are involved in;

FIG. 15 is a block diagram showing a constitution of a system performance prediction mechanism based on software component performance measurements according to a fourth embodiment of the present invention.

DETAILED DESCRIPTION OF THE PREFERRED EMBODIMENTS

The preferred embodiments of the present invention will now be described in further detail hereinafter with reference to the accompanying drawings.

First Embodiment

Figure 1:
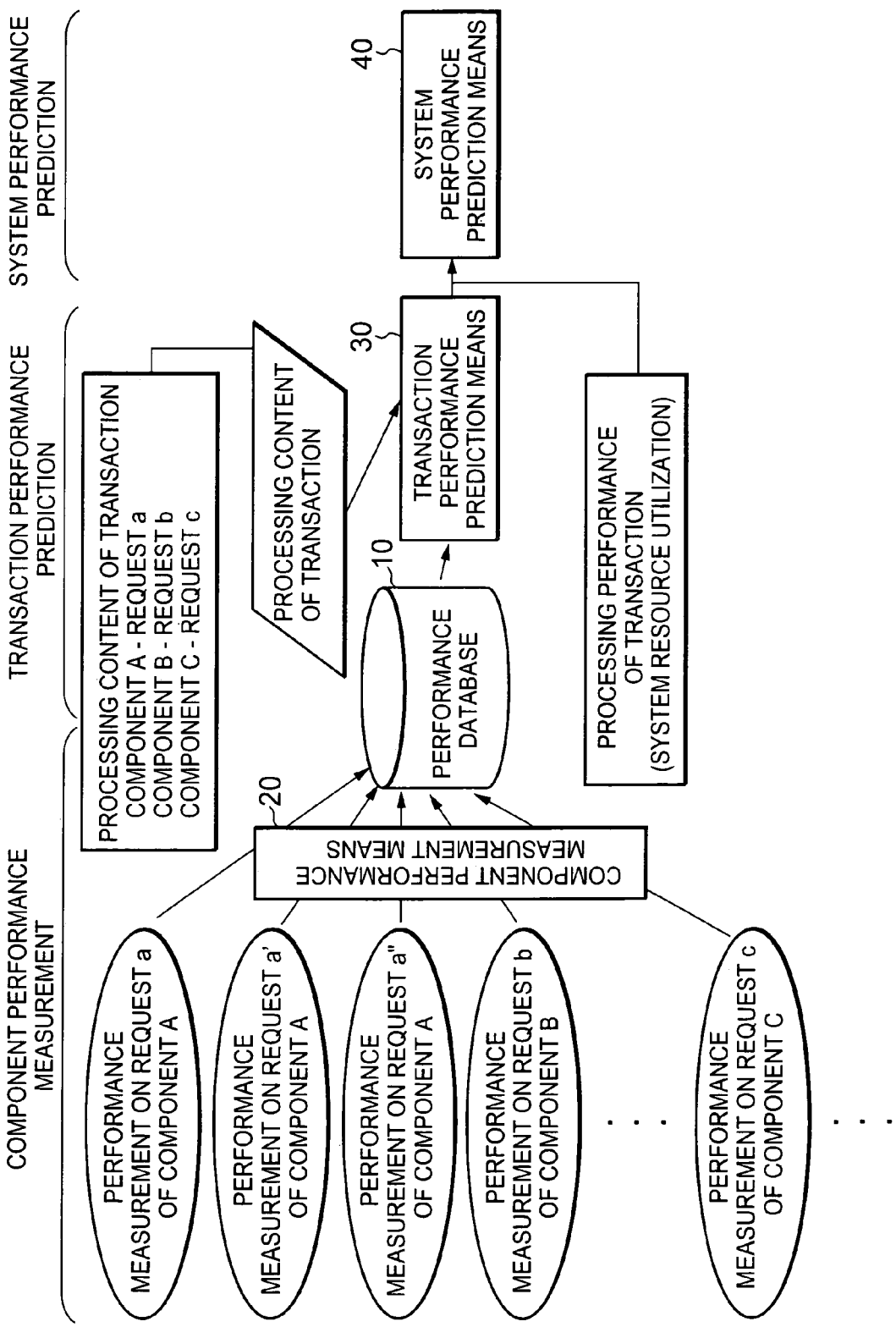
FIG. 1 is a block diagram showing a constitution of a system performance prediction mechanism based on software component performance measurements according to a first embodiment of the present invention.

Referring to FIG. 1, a system performance prediction mechanism according to a first embodiment of the present invention comprises a performance database 10 for storing system resource utilizations of individual software components, component performance measurement means 20 for measuring the system resource utilizations of the individual software components and storing a result of the measurement into the performance database 10, transaction performance prediction means 30 for predicting a system resource utilization of a transaction from the system resource utilizations of the individual software components stored in the performance database 10, and system performance prediction means 40 for predicting a system resource utilization of the entire system by inputting the system resource utilization of the transaction into a system performance prediction model.

The component performance measurement means 20 measures the system resource utilizations of the individual software components using an event trace technique that employs a kernel probe and an application probe. The application probe is inserted into a test driver to indicate a boundary between a performance test driver program (hereinafter, referred to as a test driver) and a component to be measured, while the kernel probe is inserted into a kernel of an operating system to enable an analysis of a system resource utilization of the test driver.

The above measurement is repeated to check the system resource utilizations of the software components under a plurality of operating conditions. The system resource utilizations are then stored in the performance database 10, which is to be the basis for the performance prediction, with the software components and the operating conditions as keys.

The following describes an operation of the system performance prediction mechanism based on the software component performance measurements according to the first embodiment having the above constitution.

Figure 2:
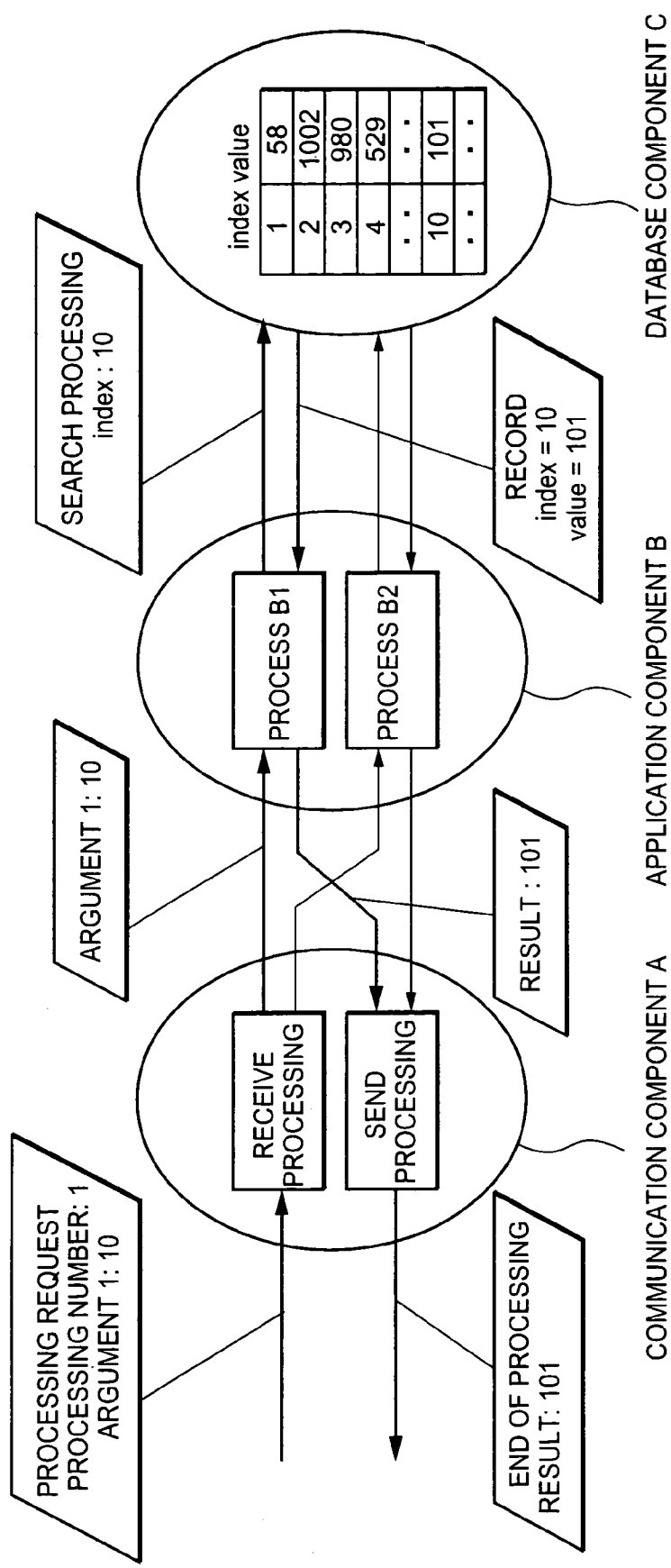

As shown in FIG. 2, first, it is assumed that three types of software components, namely, a communication component A, an application component B, and a database component C are involved in transaction processing performed by a system to be evaluated.

Figure 3:
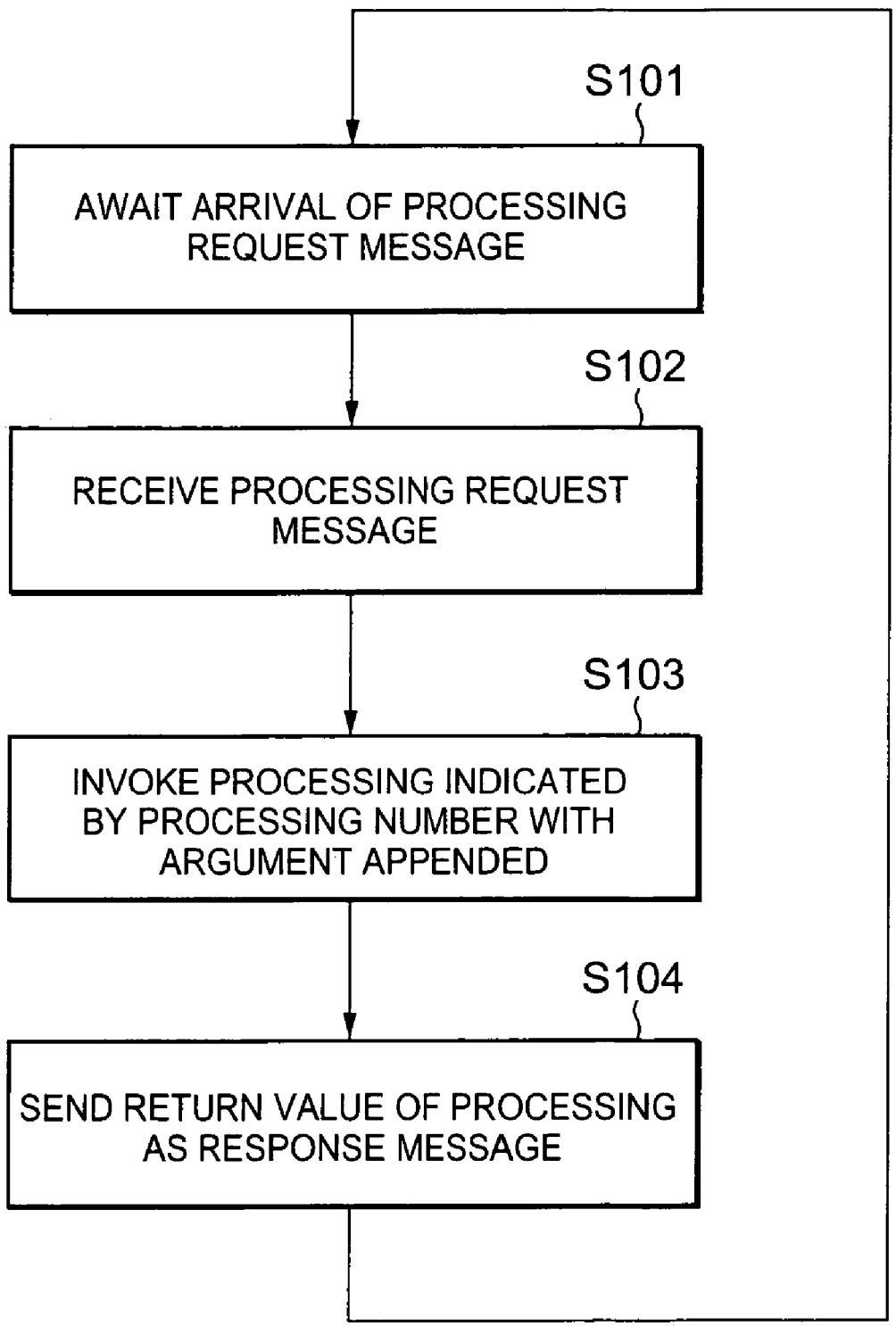
FIG. 3 is a flowchart showing an operation of the communication component in FIG. 2.

Referring to FIG. 3, there is shown a flowchart illustrating an operation of the communication component A. The communication component A awaits an arrival of a processing request message from an outside of the system (step S101), receives a processing request message (step S102), thereupon invokes processing indicated by a processing number with an argument appended to request a part of required processing from another software component (the application component B)(step S103), and sends a return value of the processing as a response message to a request source (step S104).

Referring to FIGS. 4A and 4B, there are shown flowcharts of operations of the application component B. There are two types of processes prepared in the application component B: a process B1 and a process B2. In the process B1, a search request is issued to the database component C using the number passed in an argument as an index (step S201), and a value in a value field of a retrieved record is assumed a return value (step S202). In the process B2, an update request is issued to the database component C so as to change the value in the value field of the record having an index of the number passed in the first argument to a value of a second argument (step S211), and a value indicating whether the update request is successful is assumed a return value (step S212). Upon completion of the processing of the application component B, a result of the processing is returned as a response message to the communication component A, from which a processing end message is sent as a result of the transaction processing to the outside of the system.

Figure 5:
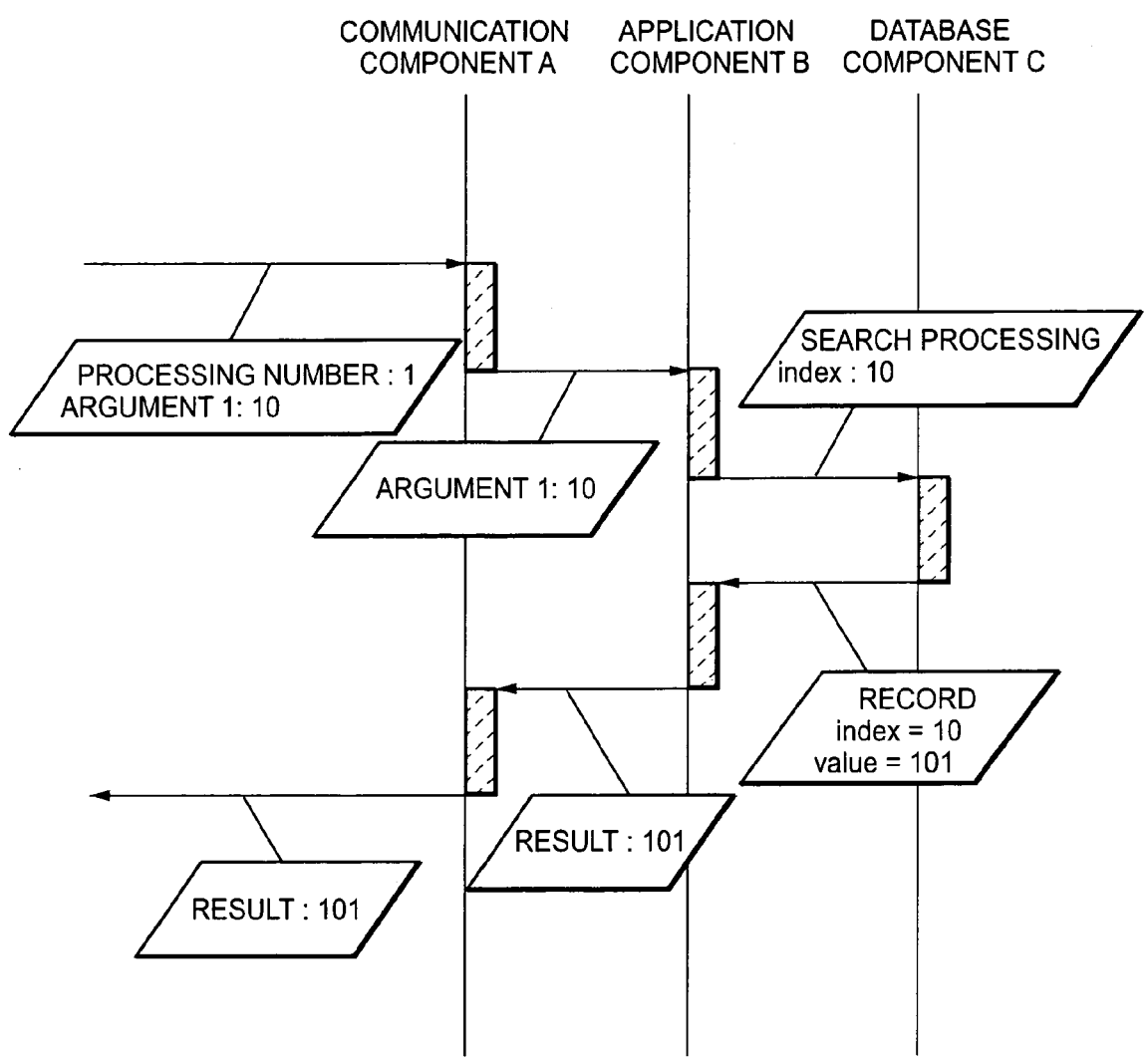
FIG. 5 is a sequence diagram showing an entire operation to be performed if any process prepared by the application component in FIG. 2 is externally requested.

Referring to FIG. 5, there is shown a sequence diagram illustrating an entire operation of the transaction processing upon an external request for the process B1 prepared in the application component B. As shown in FIG. 5, every software component performs the following operations: starting processing upon receiving a processing request from the outside of the software component (or outside of the system in some cases); proceeding with the processing of the software component while requesting processing from another software component, if necessary; and notifying the request source of a result of the processing upon completion thereof.

Suppose here that the system resource utilizations (operating time of the central processing unit (CPU) in this embodiment) necessary for the processing of the software components are found to be determined by the following factors:

1) The CPU time of the communication component A is determined by a value of an argument included in a received processing request message.

2) The CPU time of the application component B is determined by a processing content (the process B1 or the process B2 in this embodiment).

3) The CPU time of the database component C is determined by a processing content (search or update in this embodiment).

Figure 6:
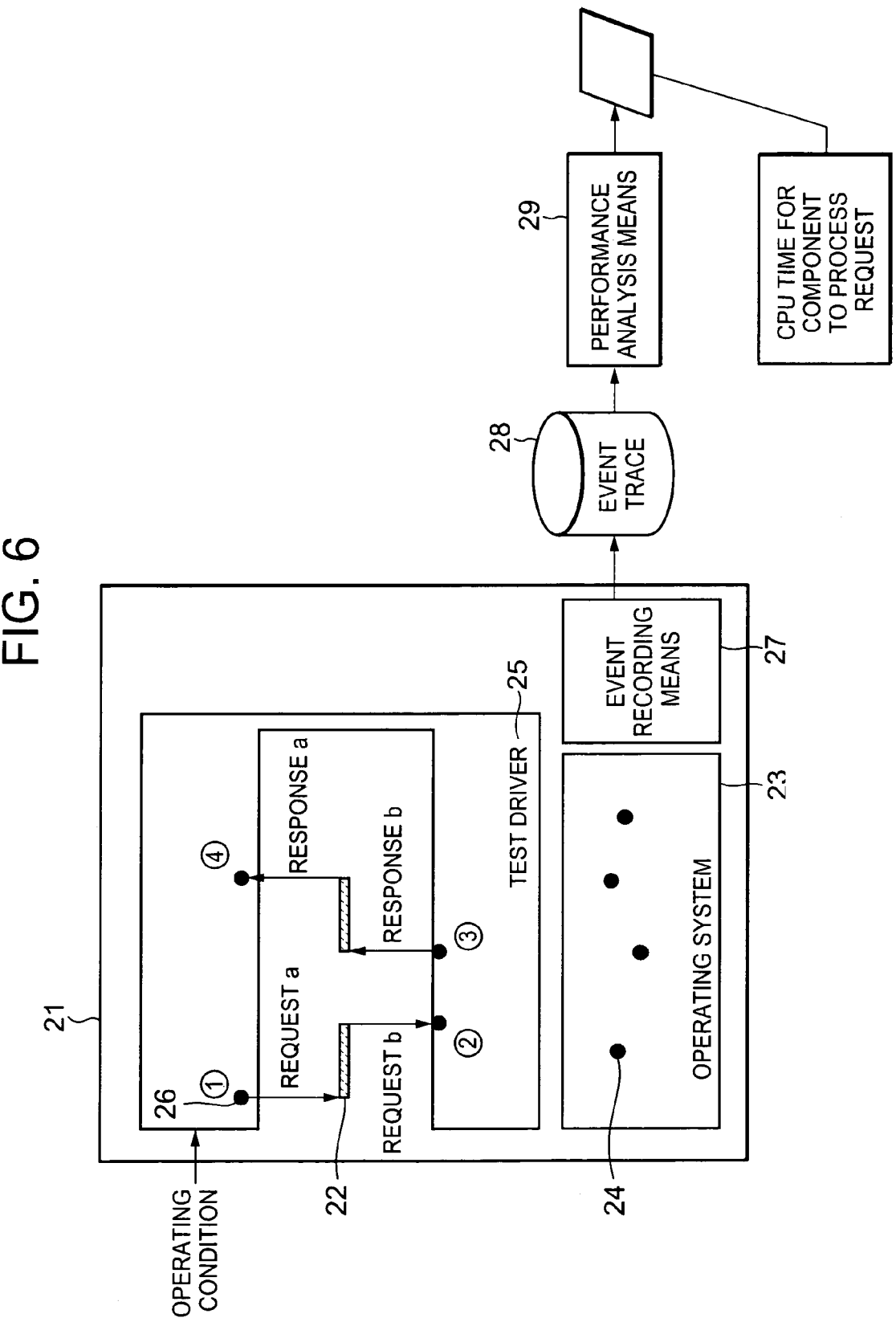
FIG. 6 is a block diagram showing an example of component performance measurement means in FIG. 1.

Referring to FIG. 6, there is shown a block diagram illustrating a configuration of the component performance measurement means 20 for measuring the CPU time as a performance. A software component to be measured by the component performance measurement means 20 (hereinafter, referred to as a measured component) shown at 22 forms a part of a system to be measured (hereinafter, referred to as a measured system) shown at 21. The measured system 21 comprises an operating system 23 where there is inserted a kernel probe 24 for detecting an event that has occurred in the measured system 21, a test driver 25 where there is inserted an application probe 26 for detecting an event that has occurred in the measured component 22, event recording means 27 for recording events detected by the application probe 26 in time series as an event trace 28, and performance analysis means 29 for analyzing the event trace 28 to calculate the CPU time for the measured component 22 to process the request.

The kernel probe 24 detects a CPU operation start (restart) event and a CPU operation end (stop) event caused by a program.

The test driver 25 inputs operating conditions as parameters among the factors determining the CPU time of the measured component 22, issues a processing request (request a) to the measured component 22, and receives a processing result (response a). Furthermore, the test driver 25 receives a processing request (request b) if the measured component 22 issues a processing request to another software component and returns a pseudo processing result (response b) in response to it. The test driver 25 has an application probe 26 previously incorporated therein for detecting an event of a control transfer to the measured component 22 ([1], [3]) and an event of a control return from the measured component 22 ([2], [4]).

Figure 7:
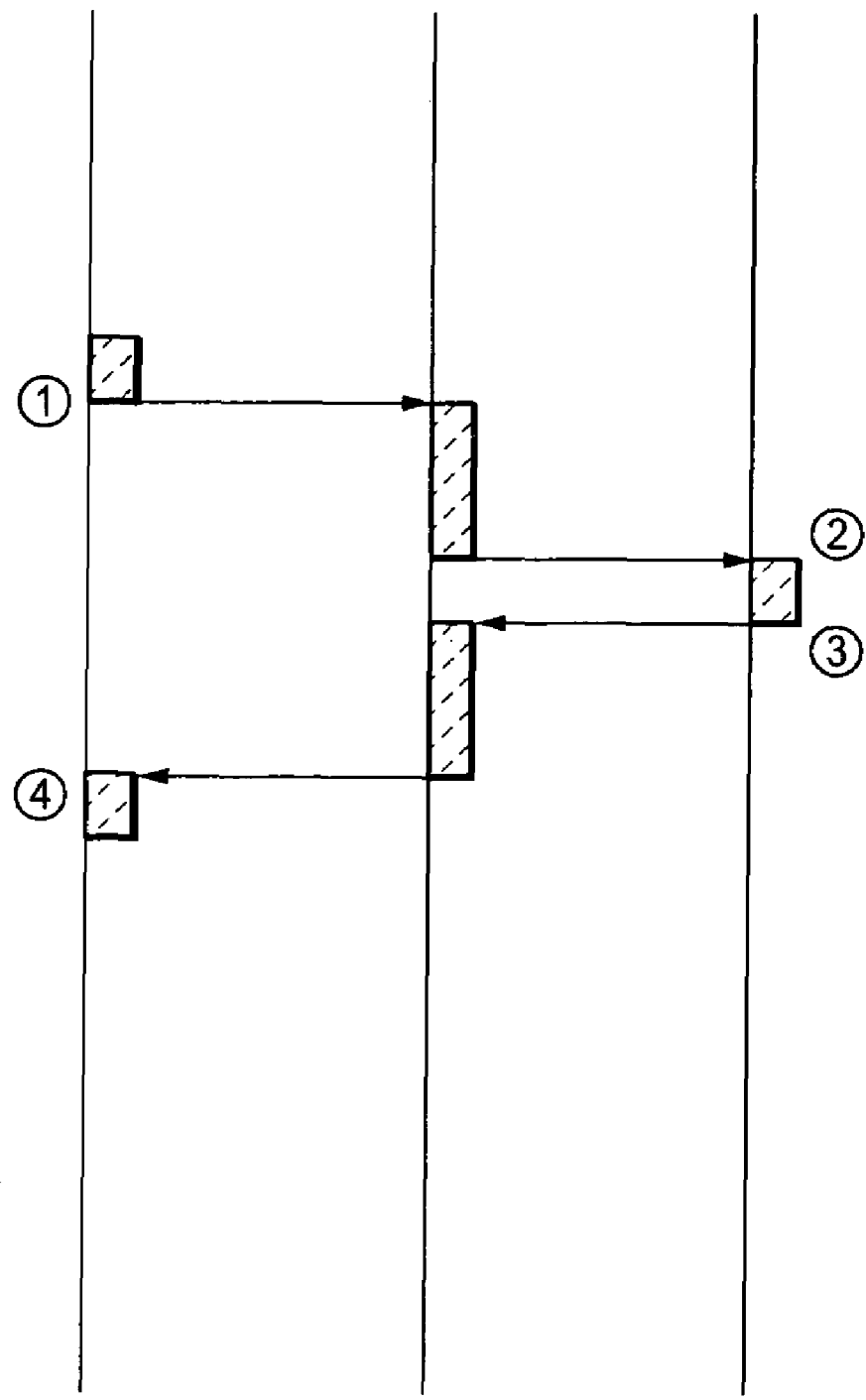
FIG. 7 is a sequence diagram showing an operation performed upon driving the application component by using a test driver in FIG. 6.

Referring to FIG. 7, there is shown a sequence diagram illustrating an operation of driving the application component B using the test driver 25 for measuring the application component. As shown in FIG. 7, operation periods (ends) of the application component B can be known by events output from the application probe 26 previously incorporated in the test driver 25.

In the performance measurement, a measurement executor gets the test driver 25 to operate giving operating conditions to drive the measured component 22. The event recording means 27 sequentially records events, which occur with the operation, thereby creating the event trace 28.

Referring to FIG. 8, there is shown an example of a content of the event trace 28. By analyzing the event trace 28 by means of the performance analysis means 29, the CPU time can be calculated with respect to a program execution from the event [1] to the event [2] and a program execution from the event [3] to the event [4]. In other words, a period of time from the event [1] to the event [2] equals 100, and the CPU operation is temporarily stopped during a period of 10 in the period of time 100. Therefore, it is known that the CPU time equals 90. Similarly, it is known that the CPU time equals 190 with respect to a period of time from the event [3] to the event [4]. Therefore, the CPU time of the measured component 22 is found to be 290 under the above operating conditions.

In the same manner, it is possible to calculate the CPU time of the measured component 22 operating under different operating conditions by making the same measurement and analysis with giving the different operating conditions to the test driver 25.

A pair of the operating conditions and the CPU time obtained in this manner is registered on the performance database 10.

The above is the performance measurement procedure executed by the component performance measurement means 20.

Referring to FIG. 9, there is shown an example of the contents of the performance database 10 created for the three types of software components, namely, the communication component A, the application component B, and the database component C shown in FIG. 2.

Depending on the measured component 22, there are cases where the upper side (the upper part of test driver 25 in FIG. 6 issuing a processing request) of the test driver 25 exists outside of the measured system (the communication component A) and where there exists no lower side (the lower part of test driver 25 in FIG. 6 receiving the processing request issued by the measured component 22 and returning a pseudo response message) of the test driver 25 (the database component C).

In measuring the system resource utilizations of the software components, in other words, in the measurement combined with the test driver 25, the test driver 25 carries out the processing for the upper component issuing a processing request to the software component or for the lower component processing the request from the software component. Therefore, it is one of the features of this embodiment that a performance measurement is possible even if the upper or lower component is uncompleted, in comparison with a real system requiring both components completed.

The following describes a performance prediction of an evaluated system executed by the system performance prediction means 40.

In general, the system performance prediction is to predict performance upon executing a plurality of transactions in parallel (throughput, transaction response time, and system resource utilization) with an input of a system resource utilization (the CPU time, etc.) necessary for processing of a single transaction. For the prediction, there are existing technologies such as a tool (a system performance prediction model) using a queuing network model or a simulation model (for example, refer to the nonpatent literature 1)). An important point of the performance prediction by the system performance prediction means 40 exists in that data to be input to the system performance prediction model, namely, a system resource utilization necessary for the processing of a single transaction is created from the performance database 10.

First, a procedure for predicting the CPU time is described below for the transaction shown in FIG. 2. Apparent from FIG. 2, the operating conditions of the software components, namely, the communication component A, the application component B, and the database component C are as follows:

1) The communication component A receives a processing request message including one argument.

2) The application component B performs the process B1.

3) The database component C performs search processing.

As a result of searching the performance database 10 shown in FIG. 9 using each software component and operating conditions as keys, it is found that the CPU time of the communication component A, the application component B, and the database component C are 10, 5, and 50, respectively. Thereby, a sequence diagram shown in FIG. 10 is obtained. As apparent from FIG. 10, the CPU time of the entire transaction equals a sum of periods of the CPU time of the software components. Therefore, the CPU time necessary for processing the transaction shown in FIG. 2 can be estimated at 65.

The CPU time for the transaction thus obtained is input to the system performance prediction model of the conventional technology to predict the performance of the entire system (mainly a relation between the throughput and the response time).

Figure 12:
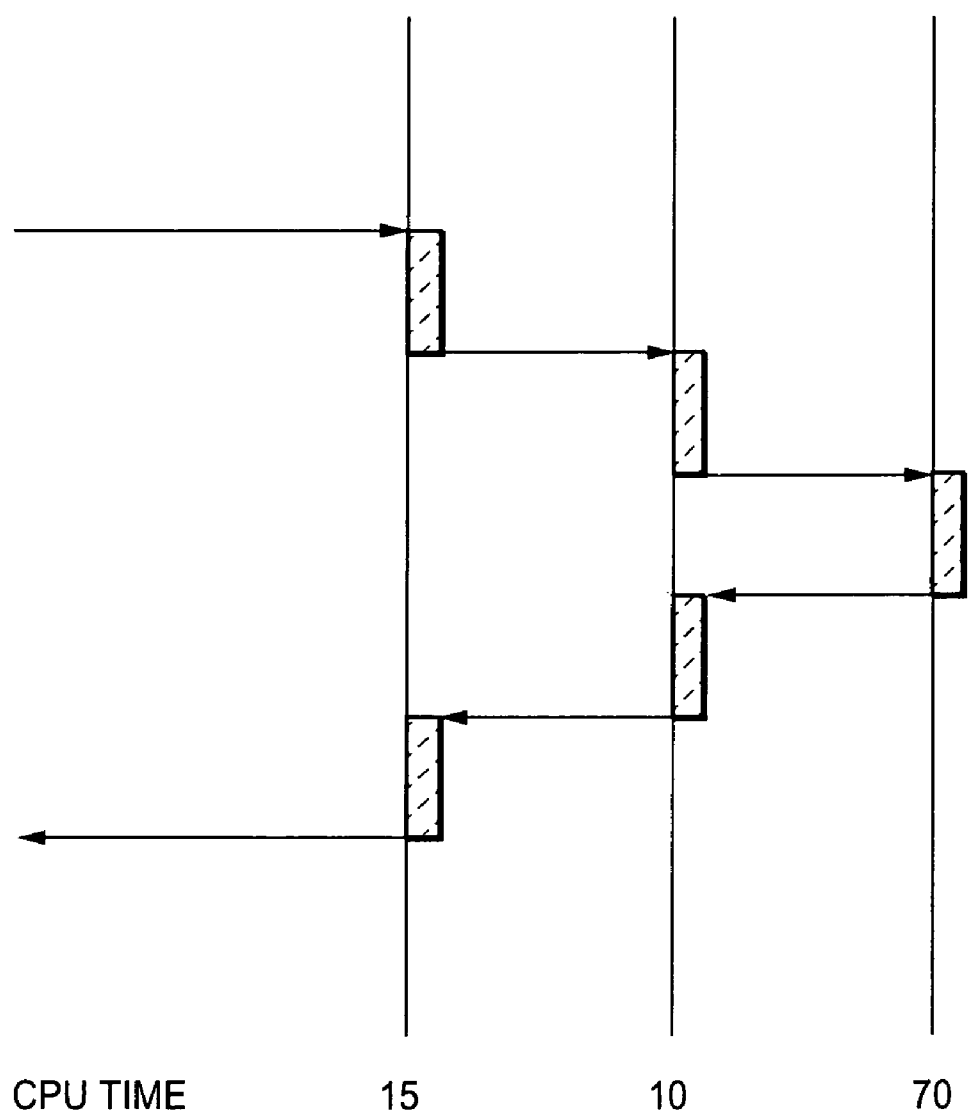
FIG. 12 is a sequence diagram showing that the CPU time for the entire transaction shown in FIG. 11 equals a sum of CPU time of the software components.

Furthermore, a performance of another transaction shown in FIG. 11 can also be predicted based on the processing content of the transaction similarly to the above procedure. More specifically, it is found that periods of the CPU time of the software components are 15, 10, and 70, respectively, on the basis of the software components and the operating conditions (receiving a processing request message including two arguments for the communication component A, performing the process B2 for the application component B, and performing an update process for the database component C). Therefore, the CPU time necessary for processing the entire transaction can be estimated at 95 from the sequence diagram shown in FIG. 12.

The CPU time for the transaction thus obtained is input to the system performance prediction model of the conventional technology to predict the performance of the entire system (mainly a relation between the throughput and the response time).

With performing performance measurements under various operating conditions by means of the component performance measurement means 20 and making the performance database 10 satisfactory as set forth in the above, it becomes possible to predict the CPU time of the entire system for processing various transactions rapidly without following performance measurement procedures for new software components. More specifically, the performance database 10 is searched by extracting operating conditions of the software components based on the processing contents of the transactions defined at the system designing and the results are totalized, thereby enabling a prediction of the CPU time necessary for processing the entire transaction.

According to the first embodiment, the system resource utilization of the entire system is predicted by combining measurement results of individual system resource utilizations of the software components. Therefore, the present invention has an effect that it is possible to predict a system resource utilization of an entire system constructed by combining the plurality of software components without constructing a real system.

Furthermore, since stored in the performance database 10 as measurement results are performances of the basic operation of the software components performed in common in processing of various transactions, it can be used for predicting system resource utilizations of different transactions. Therefore, the present invention has an effect that it is possible to predict a system resource utilization of a system composed of various software components or a system for processing various transactions by previously constructing the performance database 10.

Second Embodiment

Figure 13:
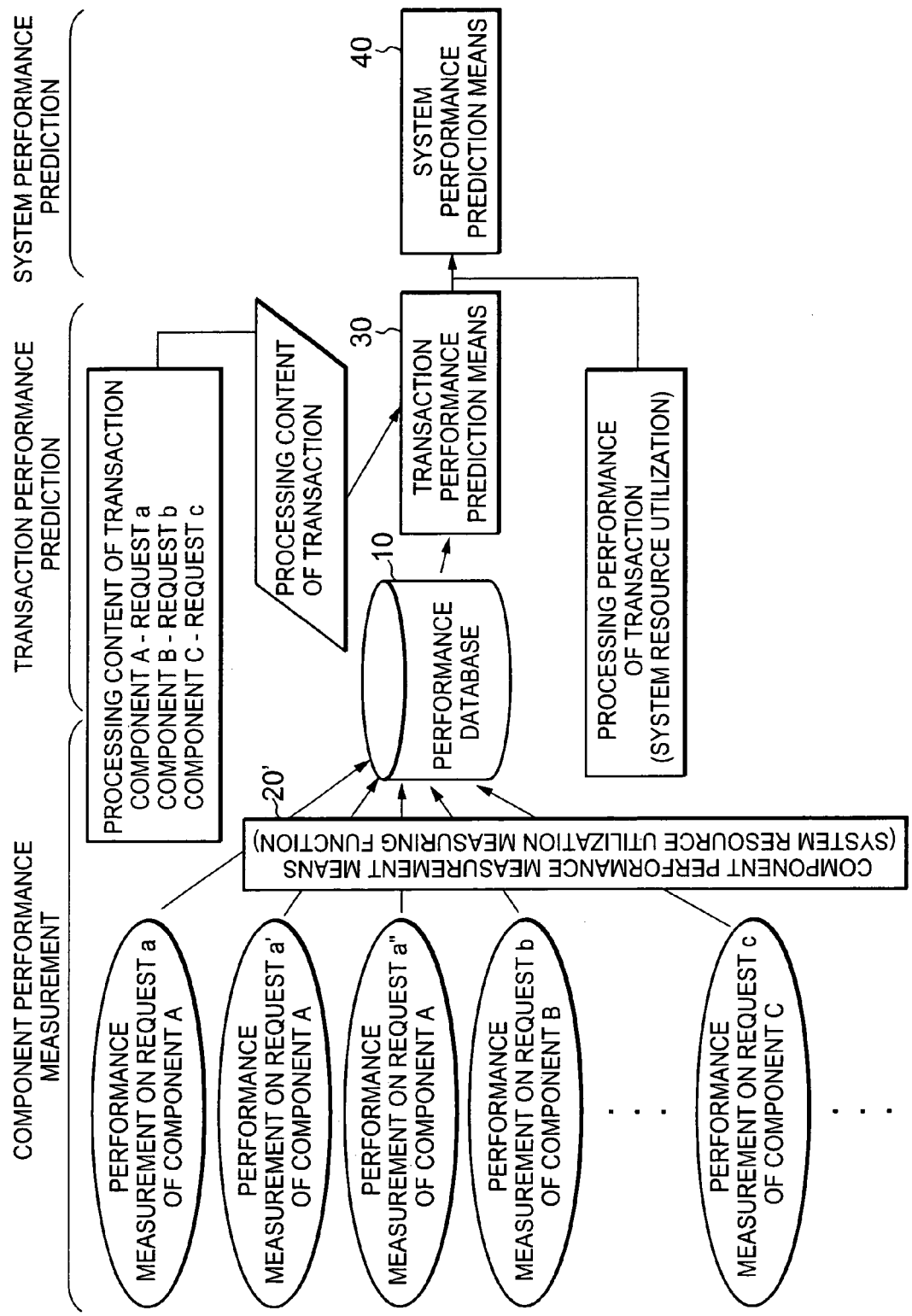
FIG. 13 is a block diagram showing a constitution of a system performance prediction mechanism based on software component performance measurements according to a second embodiment of the present invention.

Referring to FIG. 13, there is shown a block diagram illustrating a constitution of a system performance prediction mechanism based on performance measurements of software components according to a second embodiment of the present invention. The system performance prediction mechanism based on the software component performance measurements according to this embodiment has component performance measurement means 20' that uses a system resource utilization measuring function provided by basic software such as an operating system 23, instead of the component performance measurement means 20 using the event trace 28 in which both of the application probe 26 and the kernel probe 24 are used in the system performance prediction mechanism based on the software component performance measurements according to the first embodiment shown in FIG. 1. The system resource utilization measuring function is used to totalize the CPU time having been expended by each program since the start point of the execution, and the value (hereinafter, referred to as a total value of the CPU expended time) can be checked by referring to the program. Therefore, the CPU time can be predicted by checking the total value of the CPU expended time at the start point of the measurement ([1] or [3] in FIG. 7) and the end point of the measurement ([2] or [4] in FIG. 7). In other words, a sum of [2]-[1] and [4]-[3] equals the CPU time ([1] in this expression indicates a total value of the CPU expended time checked at the time [1] in FIG. 7. The same is true of [2], [3], and [4].)

If there are plural types of transactions processed by a system and their execution ratio is previously defined as system design information, the performance is predicted by inputting the CPU time predicted by the transaction performance prediction means 30 with respect to the transactions into a system performance prediction model together with the transaction execution ratio.

Third Embodiment

Figure 14:
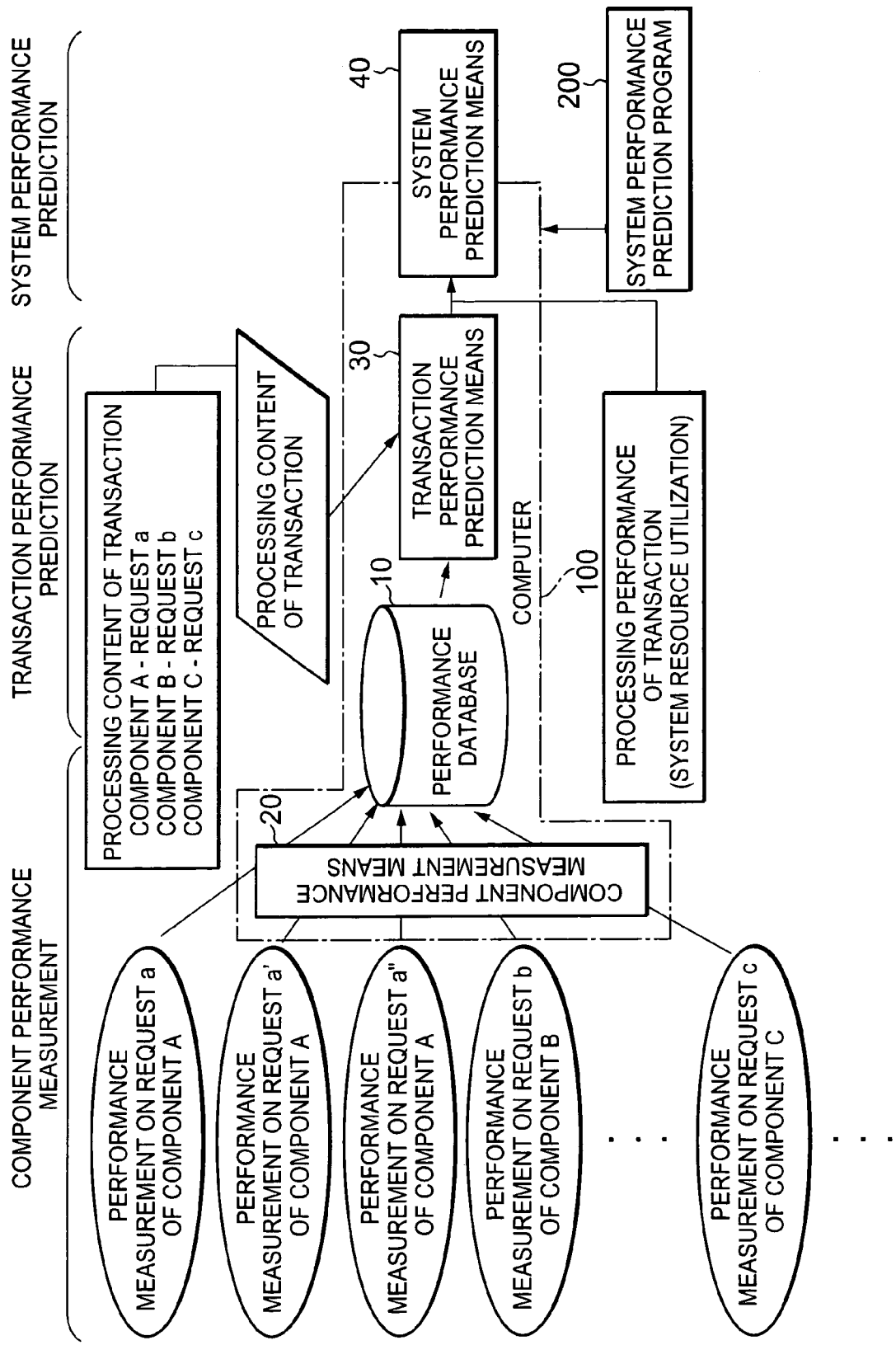
FIG. 14 is a block diagram showing a constitution of a system performance prediction mechanism based on software component performance measurements according to a third embodiment of the present invention.

Referring to FIG. 14, there is shown a block diagram illustrating a constitution of a system performance prediction mechanism based on software component performance measurements according to a third embodiment of the present invention. The system performance prediction mechanism based on the software component performance measurements according to this embodiment differs from the system performance prediction mechanism based on the software component performance measurements according to the first embodiment shown in FIG. 1 only in that a system performance prediction program 200 is added to a computer 100 equipped with the system performance prediction mechanism. Therefore, the same reference numerals have been retained for other parts not particularly referred to and their detailed description is omitted here.

The system performance prediction program 200 is read into the computer 100 to control an operation of the computer 100 by means of a performance database 10, component performance measurement means 20, transaction performance prediction means 30, and system performance prediction means 40. The operation of the computer 100 with the control of the system performance prediction program 200 is quite the same as the operation of the system performance prediction mechanism base on the software component performance measurements in the first embodiment. Therefore, the detailed description thereof is omitted here.

Fourth Embodiment

Referring to FIG. 15, there is shown a block diagram illustrating a constitution of a system performance prediction mechanism based on software component performance measurements according to a fourth embodiment of the present invention. The system performance prediction mechanism based on the software component performance measurements according to this embodiment differs from the system performance prediction mechanism based on the software component performance measurements according to the second embodiment shown in FIG. 13 only in that a system performance prediction program 200' is added to a computer 100 equipped with the system performance prediction mechanism. Therefore, the same reference numerals have been retained for other parts not particularly referred to and their detailed description is omitted here.

The system performance prediction program 200' is read into the computer 100 to control an operation of the computer 100 by means of a performance database 10, component performance measurement means 20', transaction performance prediction means 30, and system performance prediction means 40. The operation of the computer 100 with the control of the system performance prediction program 200' is quite the same as the operation of the system performance prediction mechanism base on the software component performance measurements in the second embodiment. Therefore, the detailed description thereof is omitted here.

What is claimed is:

1. A mechanism for predicting a performance of a system that combines a plurality of software components, the system performance prediction mechanism based on software component performance measurements, comprising:
   component performance measurement means for previously measuring system resource utilizations of individual software components constituting the system and storing them in a performance database;
   transaction performance prediction means for predicting system resource utilization for a transaction to be processed by the system by searching the performance database in consideration of the software components and a processing content of the transaction; and
   system performance prediction means for predicting a system resource utilization for the entire system by inputting the system resource utilizations of each transaction predicted by the transaction performance prediction means into a system performance prediction model that presents a system performance prediction,
   wherein the system resource utilization measurements of the individual software components by said component performance measurement means are made by analyzing an event trace obtained by a measurement using both an application probe for detecting an event inserted in a test driver and occurring in a component to be measured and a kernel probe for detecting an event inserted in an operating system and occurring in a system to be measured.

2. The system performance prediction mechanism according to claim 1, wherein the system resource utilization measurements of the individual software components by said component performance measurement means are made by using a system resource utilization measuring function provided by basic software.

3. The system performance prediction mechanism according to claim 1, wherein the system resource utilization prediction of the entire system by said system performance prediction means is made by determining operating conditions, under which the software components operate, from the software components and requests constituting the processing content of the transaction to be processed by the system, determining system resource utilizations by searching the performance database using each software component and operating conditions as keys, predicting the system resource utilization of the transaction by combining results of searching for the system resource utilizations of all software components involved in processing of each transaction important in the system performance, and combining the obtained results and inputting them into the system performance prediction model.

4. The system performance prediction mechanism according to claim 1, wherein the system resource utilization prediction of the entire system by said system performance prediction means is made by inputting the system resource utilizations predicted by said transaction performance prediction means with respect to individual transactions into the system performance prediction model together with a transaction execution ratio if there are plural types of transactions to be processed by the system and their execution ratio is previously defined as system design information.

5. The system performance prediction mechanism according to claim 3, wherein the system resource utilization prediction of the entire system by said system performance prediction means is made by inputting the system resource utilizations predicted by said transaction performance prediction means with respect to individual transactions into the system performance prediction model together with a transaction execution ratio if there are plural types of transactions to be processed by the system and their execution ratio is previously defined as system design information.

6. The system performance prediction mechanism according to claim 1, wherein the system resource utilization is represented by CPU time.

7. The system performance prediction mechanism according to claim 2, wherein the system resource utilization is represented by CPU time.

8. The system performance prediction mechanism according to claim 3, wherein the system resource utilization is represented by CPU time.

9. The system performance prediction mechanism according to claim 4, wherein the system resource utilization is represented by CPU time.

10. A method of predicting a performance of a system that combines a plurality of software components, the system performance prediction method based on software component performance measurements, comprising the steps of:
    previously measuring system resource utilizations of individual software components constituting the system and storing them in a performance database;
    predicting system resource utilization for a transaction to be processed by the system by searching the performance database in consideration of the software components and a processing content of the transaction; and
predicting a system resource utilization for the entire system by inputting the predicted system resource utilizations of each transaction into a system performance prediction model that presents a system performance prediction,
wherein, in the step of measuring the system resource utilizations of the individual software components, the system resource utilizations of the individual software components are determined by analyzing an event trace obtained by a measurement using both of an application probe for detecting an event having been inserted in a test driver and occurred in a component to be measured and a kernel probe for detecting an event having been inserted in an operating system and occurred in a system to be measured.

11. The system performance prediction method according to claim 10, wherein, in the step of measuring the system resource utilizations of the individual software components, the system resource utilizations of the individual software components are determined by using a system resource utilization measuring function provided by basic software.

12. The system performance prediction method according to claim 10, wherein, in the step of predicting the system resource utilization of the entire system, the system resource utilization of the entire system is predicted by determining operating conditions, under which the software components operate, from the software components and requests constituting the processing content of the transaction to be processed by the system, determining system resource utilization by searching a performance database using each software component and operating conditions as keys, predicting the system resource utilization of the transaction by combining results of searching for the system resource utilizations of all software components involved in processing of each transaction important in the system performance, and combining the obtained results and inputting them into the system performance prediction model.

13. The system performance prediction method according to claim 10, wherein, in the step of predicting the system resource utilization of the entire system, the system resource utilization of the entire system is predicted by inputting the system resource utilizations predicted by said transaction performance prediction means with respect to individual transactions into the system performance prediction model together with a transaction execution ratio if there are plural types of transactions to be processed by the system and their execution ratio is previously defined as system design information.

14. The system performance prediction method according to claim 12, wherein, in the step of predicting the system resource utilization of the entire system, the system resource utilization of the entire system is predicted by inputting the system resource utilizations predicted by said transaction performance prediction means with respect to individual transactions into the system performance prediction model together with a transaction execution ratio if there are plural types of transactions to be processed by the system and their execution ratio is previously defined as system design information.

15. The system performance prediction method according to claim 10, wherein the system resource utilization is represented by CPU time.

16. The system performance prediction method according to claim 11, wherein the system resource utilization is represented by CPU time.

17. The system performance prediction method according to claim 12, wherein the system resource utilization is represented by CPU time.

18. The system performance prediction method according to claim 13, wherein the system resource utilization is represented by CPU time.

* * * * *